United States Statutory Invention Registration [19]

[11] Reg. Number: H954

Lang et al. [43] Published: Aug. 6, 1991

[54] LUMPED ELEMENT DIGITAL PHASE SHIFTER BIT

[75] Inventors: Mark R. Lang, Fayetteville; Ronald J. Naster, Liverpool, both of N.Y.; Conrad E. Nelson, Jensen Beach, Fla.

[73] Assignee: The United States of America as represented by the Secretary of the Air Force, Washington, D.C.

[21] Appl. No.: 548,653

[22] Filed: Jul. 5, 1990

[51] Int. Cl.[5] ..... H01P 3/00

[52] U.S. Cl. ..... 333/164

[56] References Cited

U.S. PATENT DOCUMENTS

| | | | |
|---|---|---|---|
| 4,471,330 | 9/1984 | Naster et al. | 333/164 |
| 4,556,808 | 12/1985 | Coats | 307/571 |
| 4,612,520 | 9/1986 | Boire | 333/156 |
| 4,630,010 | 12/1986 | Yarman | 333/139 |
| 4,652,883 | 3/1987 | Andricos | 342/372 |

OTHER PUBLICATIONS

Affordable MMIC Designs for Phased Arrays, Naster, Jacomb-Hood and Lang, General Electric Co., Electronics Lab., N.Y.

*Primary Examiner*—Linda J. Wallace

*Attorney, Agent, or Firm*—Donald J. Singer; Gerald B. Hollins

[57] ABSTRACT

Digital phase shifter bits of predetermined phase shift capability and lumped element network component fabrication arrangement are described. A variety of phase shifter bits including the capability of eleven and one-quarter, twenty-two and one-half, forty-five, ninety, and one hundred eighty degrees of phase shift are included. Also included are a number of high-pass/-low-pass and switching transistor inclusive phase shifter bit arrangements. Both electrical schematic diagram and integrated circuit embodiments of the phase shifting networks are also disclosed.

13 Claims, 8 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Table 1. Element Values for Series Loaded Line Phase Shifter Configurations at L-Band

| Bit Size | Element (nH/pF) | Fig. 1 Configuration 100 | 102 | 104 | 106 | 108 | 110 | 112 |
|---|---|---|---|---|---|---|---|---|
| 90° (1000μm) | $L_1$ | -- | 14.8 | 43.3 | 1.7 | 7.5 | -- | 9.9 |
| | $L_2$ | 14.8 | 20.9 | 14.8 | 14.8 | -- | 28.9 | -- |
| | $L_3$ | -- | -- | 61.2 | 61.2 | 10.7 | 10.7 | 10.7 |
| | $C_1$ | 1.7 | -- | 2.1 | 1.4 | 0.3 | 1.0 | 11.8 |
| | $C_2$ | -- | 0.6 | -- | -- | 1.0 | 0.6 | 1.0 |
| | $C_3$ | 1.0 | 1.0 | 1.0 | 1.3 | -- | -- | -- |
| | $C_{FET}$ | 0.18 | 0.18 | 0.18 | 0.18 | 0.18 | 0.18 | 0.18 |
| 45° (2000μm) | $L_1$ | -- | 9.2 | 33.1 | 1.3 | 5.9 | -- | 7.4 |
| | $L_2$ | 9.2 | 7.0 | 9.2 | 9.2 | -- | 14.2 | -- |
| | $L_3$ | -- | -- | 25.4 | 25.4 | 4.5 | 4.5 | 4.5 |
| | $C_1$ | 2.3 | -- | 2.7 | 1.9 | 0.3 | 1.6 | 18.6 |
| | $C_2$ | -- | 1.2 | -- | -- | 1.6 | 1.8 | 1.6 |
| | $C_3$ | 2.6 | 2.6 | 3.2 | 3.2 | -- | -- | -- |
| | $C_{FET}$ | 0.36 | 0.36 | 0.18 | 0.36 | 0.36 | 0.36 | 0.36 |
| 22.5° (4000μm) | $L_1$ | -- | 7.4 | 31.2 | 1.2 | 5.6 | -- | 7.0 |
| | $L_2$ | 7.4 | 2.9 | 7.5 | 7.5 | -- | 10.0 | -- |
| | $L_3$ | -- | -- | 12.2 | 12.2 | 2.2 | 2.2 | 2.2 |
| | $C_1$ | 2.4 | -- | 2.9 | 2.0 | 0.3 | 2.0 | 20.5 |
| | $C_2$ | -- | 1.7 | -- | -- | 2.0 | 3.8 | 2.0 |
| | $C_3$ | 5.4 | 5.4 | 6.7 | 6.7 | -- | -- | -- |
| | $C_{FET}$ | 0.72 | 0.72 | 0.72 | 0.72 | 0.72 | 0.72 | 0.72 |
| 11.25° (8000μm) | $L_1$ | -- | 6.8 | 30.8 | 1.2 | 5.5 | -- | 6.9 |
| | $L_2$ | 6.8 | 1.3 | 6.8 | 6.8 | -- | 8.3 | -- |
| | $L_3$ | -- | -- | 6.0 | 6.0 | 1.1 | 1.1 | 1.1 |
| | $C_1$ | 2.4 | -- | 2.9 | 2.0 | 0.3 | 2.2 | 21.0 |
| | $C_2$ | -- | 2.0 | -- | -- | 2.2 | 6.9 | 2.2 |
| | $C_3$ | 11.0 | 11.0 | 13.5 | 13.5 | -- | -- | -- |
| | $C_{FET}$ | 1.44 | 1.44 | 1.44 | 1.44 | 1.44 | 1.44 | 1.44 |

*Fig. 10*

Table 2. Element Values for Switched Filter Bits at L-Band

| Bit | Low Pass Circuit $C_1$ (pF) | Low Pass Circuit $L_1$ (nH) | High Pass Circuit $C_2$ (pF) | High Pass Circuit $L_2$ (nH) |
|---|---|---|---|---|
| 11.25° | 0.12 | 0.60 | 49.8 | 62.5 |
| 22.5° | 0.24 | 1.19 | 24.9 | 31.4 |
| 45° | 0.49 | 2.34 | 12.3 | 16.0 |
| 90° | 1.01 | 4.33 | 5.9 | 8.7 |
| 180° | 2.45 | 6.12 | 2.5 | 6.1 |

*Fig. 11*

LUMPED ELEMENT DIGITAL PHASE SHIFTER BIT

RIGHTS OF THE GOVERNMENT

The invention described herein may be manufactured and used by or for the government of the United States for all governmental purposes without the payment of any royalty.

BACKGROUND OF THE INVENTION

This invention relates to the field of integrated circuit electronic networks providing selectable degrees of signal phase shift at microwave operating frequencies.

Phased array radar antennas and other microwave apparatus have need of digitally selectable phase delaying networks which are both low in fabrication cost and of the smallest possible physical size. For operating frequencies above ten gigahertz the use of distributed components in these phase shifting networks has become an accepted design practice in the microwave art. For frequencies below ten gigahertz, however, distributed component phase shifting components such as quarter wavelength microstrip delay lines become prohibitively long in physical size for implementation on an integrated circuit chip. In addition to the difficulty of containing these large phase shifting network components in an electronic apparatus—an apparatus which is almost always limited in physical size—the cost of fabricating these unduly large sized networks is found to be directly related to the physical size of the integrated circuit chip used to contain the network so that the large size in itself promotes undesirable apparatus cost.

The prior patent art includes several examples of previous phase shifting network practices. Included in these prior patents is the U.S. Pat. No. 4,471,329 of E. C. d'Oro which concerns a microstrip waveguide structure; the U.S. Pat. No. 4,471,330 of Naster et al which shows a conventional digital phase shifting bit that incorporates high frequency transmission lines; the U.S. Pat. No. 4,556,808 of Coats in which integrated lumped element pi-networks replace quarter wavelength transmission lines in a switching circuit arrangement; the U.S. Pat. No. 4,612,520 of Borie et al which describes a wideband 180 degree phase shifter bit that includes both transmission line segments and a pi-network; the U.S. Pat. No. 4,630,010 of Yarman which shows a low pass digital phase shifter for use at extra high frequencies; and the U.S. Pat. No. 4,652,883 of Andricos which concerns a signal phase shifter for use in a phased array radar system. None of these prior patents, however, achieves the advantages of the lumped element digital phase shifter bit of the present invention.

SUMMARY OF THE INVENTION

The present invention achieves both a physical size reduction and a fabrication cost reduction in the realization of certain microwave phase shifting elements through the use of lumped electrical elements as a replacement for the distributed elements normally used in such networks. The invention is also related to phase shifting networks in which a digital control signal can be used to alter the achieved degree of phase shift between discrete predetermined values.

It is an object of the invention therefore to provide a phase shifting network arrangement which is of desirable low cost and small physical size.

It is another object of the invention to provide a phase shifting network realization arrangement which is especially advantageous for use in the lower frequency portion of the microwave spectrum.

It is another object of the invention to provide a plurality of alternate phase shifting network circuit configurations which may be embodied in discrete or lumped element integrated circuit form.

It is another object of the invention to provide discrete component or lumped element integrated circuit phase shifting networks in which a binary control signal and switching transistor elements are selective of different network frequency response characteristics.

It is another object of the invention to provide lumped element phase shifting networks which may be readily configured to a plurality of different phase shift values.

Additional objects and features of the invention will be understood from the following description and the accompanying drawings.

These and other objects of the invention are achieved by integrated circuit digital phase shifter apparatus for use at microwave signal frequencies below ten gigahertz which includes the combination of; an integrated circuit die member having a semiconductor body portion and an upward facing planar surface; a plurality of discrete electrical inductance elements disposed in predetermined physical location array across said die member upward facing planar surface; a plurality of discrete electrical capacitance elements disposed in predetermined physical location array across said upward facing planar surface of said die member in predetermined phase shifting electrical network interconnection with said electrical inductance elements.

BRIEF DESCRIPTION OF THE DRAWINGS

FIG. 10 shows a table of values for embodying one arrangement of the FIG. 1 network circuits as integrated circuit devices.

FIG. 11 shows a table of values for embodying the network of FIG. 5 as an integrated circuit.

DETAILED DESCRIPTION

Figure 1A:
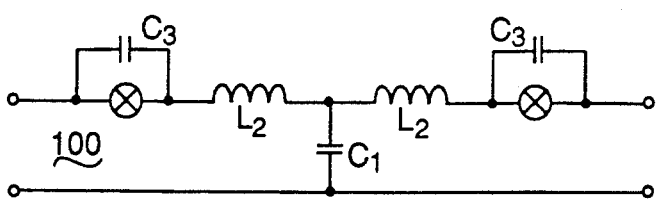
FIG. 1 shows a plurality of electrical networks which may be used in the present lumped element phase shift invention.
Figure 1B:
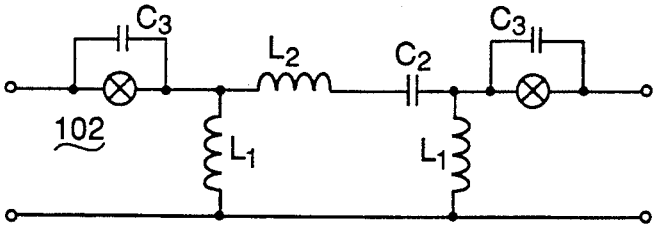
Figure 1C:
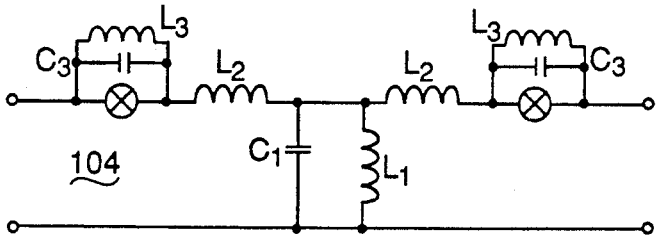
Figure 1D:
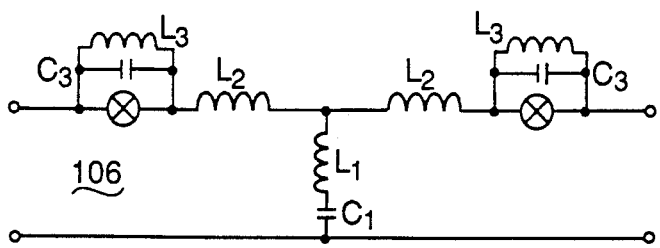
Figure 1E:
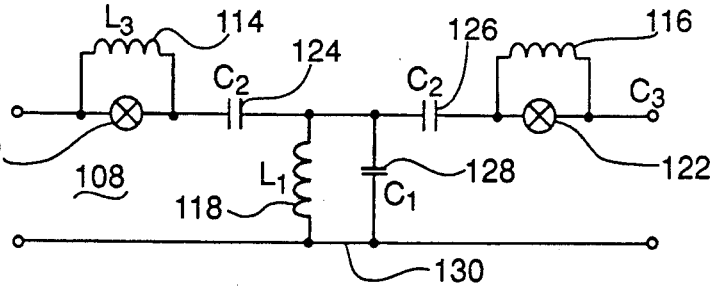
Figure 1F:
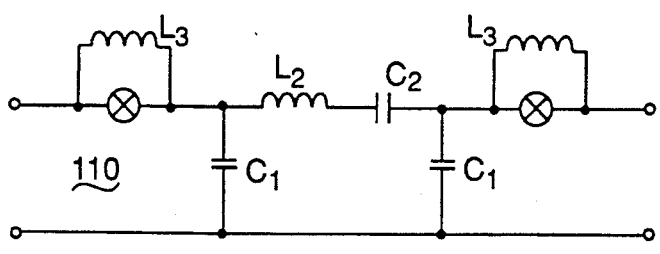
Figure 1G:
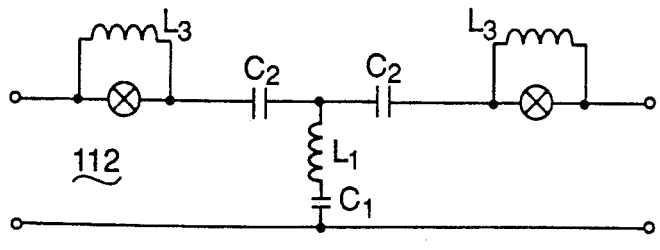

FIG. 1 in the drawings shows a collection of seven tee and pi configured electrical networks which may be embodied as microwave phase shifting devices using the lumped element concept of the present invention. Each of the different network configurations 100, 102, 104, 106, 108, 110, and 112 in FIG. 1 employs a plurality of inductive, capacitance, and transistor elements which are provided with selected electrical values in order to achieve a predetermined degree of microwave signal phase shift between the input and output terminals of the network.

In the FIG. 1 drawing the transistor element in each of the different networks are indicated by the circle having an inscribed x as is indicated at 120 and 122 in the network configuration 108, for example. Preferably these transistor are of the field effect type and are fabricated directly onto the surface of the host integrated circuit device using one of the known transistor fabrication technologies. Typically, transistors of this type may have a turned on resistance which is in the range of 0.54 ohm-centimeters, a turned off resistance and capacitance combination of 0.36 ohm-centimeter and 1.72 picofarad per centimeter.

Figure 2:
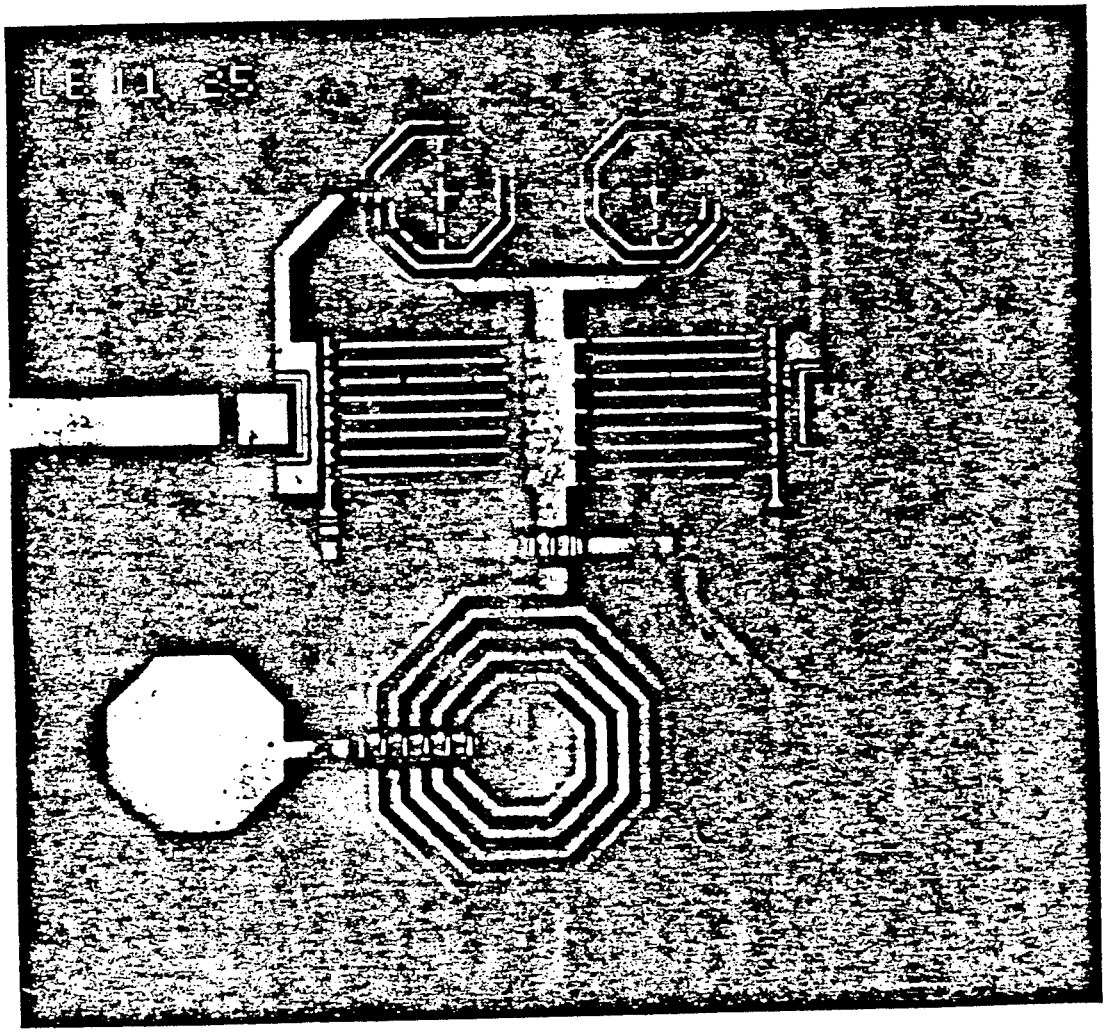
FIG. 2 shows an integrated circuit realization of one FIG. 1 network configuration 108 herein, as arranged for one specific degree of phase shift (11.25°).
Figure 3:
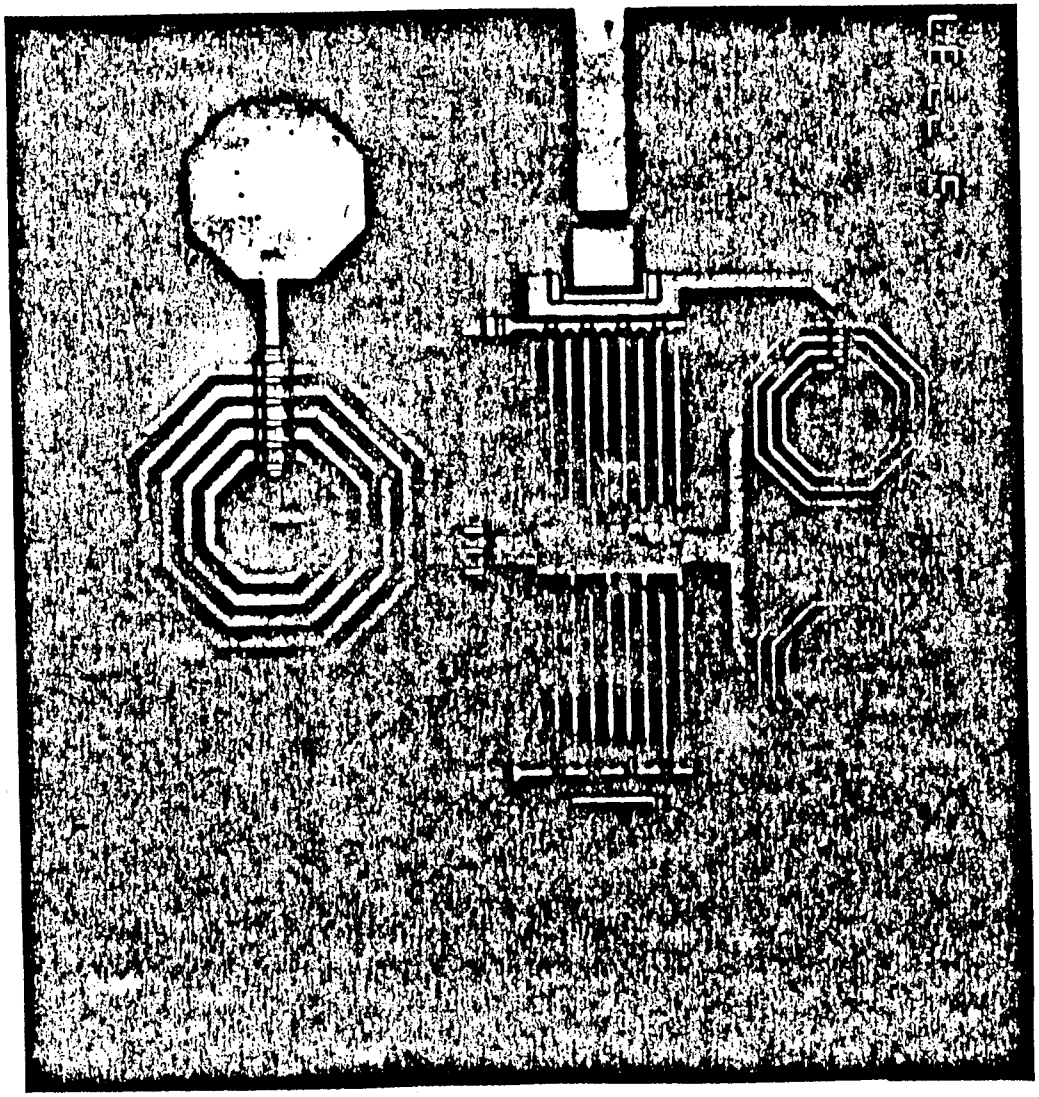
FIG. 3 shows an integrated circuit realization of one FIG. 1 network as arranged for a second degree of phase shift (22.5°).
Figure 4:
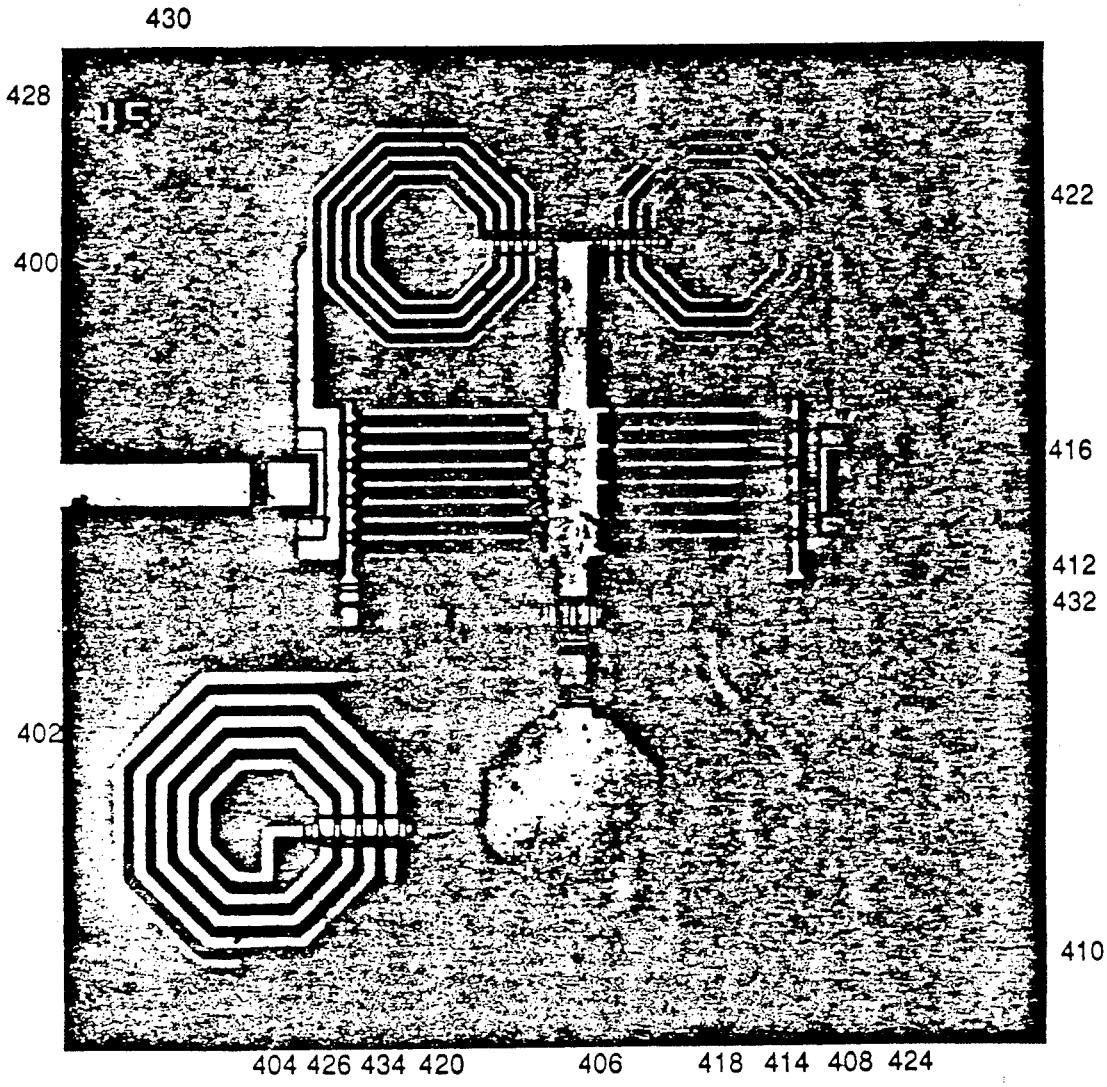
FIG. 4 shows an integrated circuit realization of one FIG. 1 network as arranged for a third degree of phase shift (45°).

In view of the differing number of s-plane analysis poles and zeros and the otherwise differing electrical configurations of the networks shown in FIG. 1, variations in the change of signal phase delay with frequency can be expected with differing ones of the FIG. 1 configurations. One of the FIG. 1 configurations, the configuration 108, is believed typical and is selected for embodiment in the FIGS. 2–4 illustrated phase shift circuits.

The configuration 108 includes the two transistors 120 and 122 which are connected in shunt with the inductive elements 114 and 116 and this shunt combination as is connected in series with the capacitance elements 124 and 126; the junction between the capacitance elements is connected to the network common terminal by the shunt combination of the inductance 118 and the capacitance 128. A table of values for these and other FIG. 1 inductive and capacitance elements, using the C and L subscripted numeral identifications and the circuit identifications shown in FIG. 1, appears in the Table 1 of FIG. 10 in the drawings. Although the network configuration 108 and indeed all of the network configurations shown in FIG. 1 may be tailored for use at any number of different frequencies, the table of values shown in FIG. 10 presumes use in the "L" band or 1.3 gigahertz frequency range.

As is indicated by the numerical values in the left most column of the table 1 in FIG. 10, varying predetermined amounts of phase shift are to be realized from the use of different values in the network configuration 108. The numbers between 100 and 112 along the top most portion of FIG. 10, of course, identifies the differing network configurations shown in FIG. 1. The column of numbers in the seventh column from the left hand edge in FIG. 10 is particularly applicable to the network configuration 108 in FIG. 1. The shunt capacitor 128 in the network configuration 108 is shown in Table 1 to have a electrical value between 1.0 and 2.2 picofarads according to the desired value of phase shift being ninety or eleven and one quarter or some intermediate number of electrical degrees.

The size or magnitude of the component values recited in Table 1 suggest that the network configuration 108 is one of the more desirable of the configurations shown in FIG. 1 for realization in the form of an integrated circuit network. A comparison of the component values shown in Table 1, for example, shows that indicators in the range of 1.1 to 9.9 nanohenrys are required for phase shifts between 11.25 and 90 degrees and capacitances of 1.6 to 20.5 picofarads are required. For other of the FIG. 1 networks, however, the required inductor sizes may be as large as 33, 43 or even 61 nanohenrys. In a practical environmental it is found that inductances above 20 nanohenrys and capacitances less than 0.1 picofarad are difficult to fabricate as integrated circuit elements. The moderate range of the configuration 108 values recited in Table 1 therefore make this network a desirable choice for the present usage.

By way of including the switching transistor devices 120 and 122 in the network configuration 108 of FIG. 1 this network is provided with the capability of operating as either a series loaded line phase shifter. A loaded line phase shifter serves to periodically load a transmission line with alterable reactances to achieve phase shift. The periodicity of the reactance is nominally a quarter wavelength to properly cancel mismatches introduced by the reactive loads.

In the various configurations in FIG. 1, a single quarter wavelength section is used with reactive loading being located at each end. For this invention, the distributed quarter wavelength transmission line is in fact replaced by a lumped element equivalent circuit which consists of capacitors and inductors (in FIG. 1 these are represented by $L_1$, $L_2$, $C_1$, and $C_2$). The loading reactance is achieved by the parallel combination of the switching device or switching transistor and a parallel inductor and/or capacitor (in the configurations of FIG. 1 these are represented by $L_3$ and $C_3$). The switching device is used to alter the loading reactance and therefore alter the phase through the circuit. The amount of phase shift is proportional to the amount of reactance change.

The switching devices shown in FIG. 1 are preferably embodied as field effect transistors (FETs)—a three terminal device with terminals designated as gate, drain, and source. The FET when operated as a switch uses the gate to modulate the conductance between the source and drain. The conditions for operating the FET as a microwave switch require the source and drain to each have an applied DC potential of zero volts and the gate have an applied DC potential of either zero volts or a negative DC potential. The FET as a switch is considered "on" when the gate potential is zero whereby the microwave signal applied to the drain is passed to the source with minimal alteration. The FET as a switch is considered "off" when the applied gate potential is beyond the device pinchoff voltage (usually −5V) which causes significant microwave signal attenuation when passing from the drain to the source. Since the FET when operated as a switch is bilateral in nature, the microwave signal can be applied to either the drain or the source terminals.

FIGS. 2, 3, and 4 in the drawings show integrated circuit chip embodiments of the network configuration 108 in FIG. 1 with each of these embodiments resulting in a different amount of phase shift to an applied L band microwave signal. The FIG. 4 forty-five degree phase shift embodiment of the network 108 is typical of the FIGS. 2–4 circuit devices and is described in some detail herein along with appropriate references to the other two figures.

In view of the glossy photographic print nature of the FIG. 4 drawing in the present application, document references to individual portions of the FIG. 4 network are accomplished with an array of coordinated reference numbers, the numbers between 402 and 430 in FIG. 4, rather than with the usual number attached to a lead line arrangement. In the FIG. 4 integrated structure, for example, the spiral configured conductors centered at the intersection of the coordinates 402 and 404 represents the inductance L1, 118 in the FIG. 1 drawing. In a similar manner the node at the intersection of the coordinates 402 and 406 in FIG. 4 represents the lower or common conductor 130 in FIG. 1. The capacitor C1 at 128 in FIG. 1 is shown at the intersection of the coordinates 406 and 432 in FIG. 4 while the transistor 120 in FIG. 1 is shown at the intersection of coordinates 416 and 420 and the transistor 122 at the intersection of coordinates 416 and 418 in FIG. 4.

It should be noted that the position of the capacitor C2 at 126 in FIG. 1 and the shunt combination of the inductance 116 and transistor 122 are interchanged in the network embodiment of FIG. 4. As is known in the electrical network art, the interchanging or interposition of series connected electrical components has no effect on the electrical properties of the network. In a similar manner the position of the capacitor C2 at 124 and the inductor 114 and transistor 120 are interchanged in the FIG. 4 circuit arrangement.

Continuing then with the correlation of components in FIGS. 1 and 4, the inductor L3 at 114 in FIG. 1 is shown at the intersection of the coordinates 420 and 422 in FIG. 4 while the inductor L3 at 116 in FIG. 1 resides at the intersection of the coordinates 418 and 422 in FIG. 4. The capacitor C2 at 124 appears at the 404–416 coordinate intersection in FIG. 4 while the capacitor C2 at 126 appears at the coordinate intersection 408–416.

The portions of the FIG. 4 embodiment lying at the coordinate intersections 414–412 and 434–412 comprise electrical resistances which are not shown in the FIG. 1 schematic diagram but which are connected in electrical series with the transistor gate terminals in order to isolate the radio frequency and DC level control signals which exist in the transistors 120 and 122. DC resistance values in the range of 2000 ohms are found appropriate for this isolation. As is indicated in the upper left hand corner of the FIG. 4 embodiment, at the intersection of the coordinates 428 and 430, the phase shifting circuitry of FIG. 4 is intended to provide a phase shift of 45 degrees at L-band operating frequency.

The integrated circuit substrate which is indicated at 400 in FIG. 4 may be fabricated from one of the known semiconductor material, however, gallium arsenide is the preferred material. At 408–410 in FIG. 4 is located a gate control connection by which the digital signals controlling transistor operation is received onto the integrated circuit chip. The output terminals of FIG. 4 network are shown at the extreme left and right edges of the circuit chip in line with the coordinate 416.

Except for electrical values and resulting changes in discrete component physical sizes, the eleven and one quarter degree and twenty two and one half degree phase shifting networks embodied in FIG. 2 and FIG. 3 are similar to the above described FIG. 4 embodiment.

Figure 5:
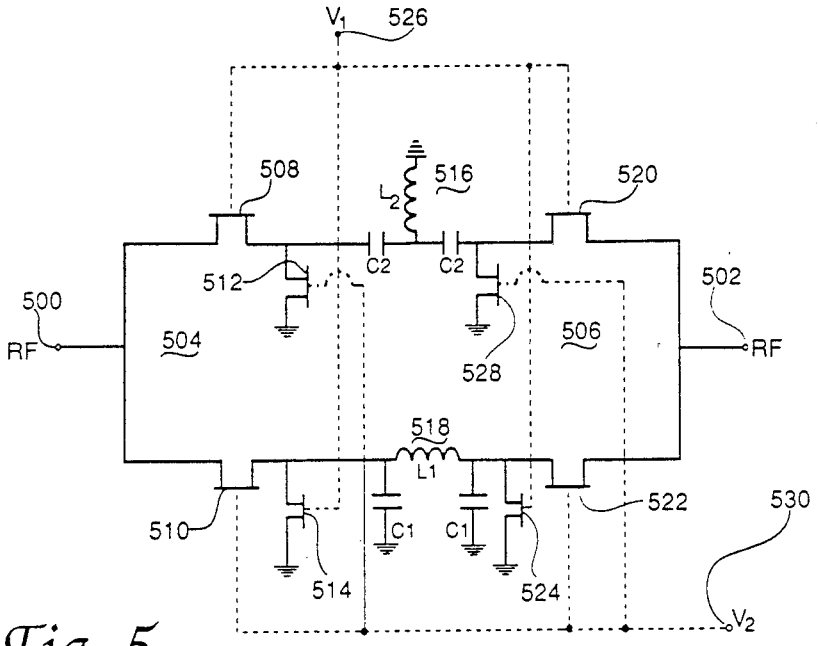
FIG. 5 shows a two path pi-configured phase shifting network including a pair of path selecting transistor switching arrays.

FIG. 5 in the drawings shows a high-pass/low-pass phase shifting network that is combined with a pair of transistorized single pole double throw switches. The transistorized switches are located at the input and output terminals of the FIG. 5 network. In the FIG. 5 circuit the high-pass network is located at 516 in the top arm of the circuit while the low-pass network is at 518 in the lower arm of the network and the input transistor switches is located at 504 and the output switch at 506. The network input terminals 500 is shown coupled to a pair of series pass field effect transistors 508 and 510 and the signal emerging from these series pass transistors is shunted by the two crowbar transistors 512 and 514. A similar transistor switching arrangement is shown at 506 adjacent the output terminal 502.

During operation of the FIG. 5 circuit it is contemplated that two of the series pass transistors such as the transistors 508 and 520 and two of the crowbar transistors such as the transistors 514 and 524 will be maintained in the conducting conditions by application of a suitable voltage at the node 526—in order to make use of the high-pass phase shifting network 516. Alternately, for use of the low-pass network 518 the transistors 510, 522, 512, and 528 will be placed in the conducting condition by a suitable voltage to the node 530.

Underlying the FIG. 5 circuit is the concept that a low-pass filter comprised of series inductors and shunt capacitors provide phase delay to signals passing through it. A high-pass filter comprised of series capacitors and shunt inductors similarly provides phase advance. By arranging switches to permit switching between the low-pass and high-pass configurations, a phase shifter can be made which is smaller than the other types while also achieving good bandwidth characteristics. A table of values for the FIG. 5 circuit operating at L-band frequencies is shown in FIG. 11, Table 2 of the drawings.

Figure 7:
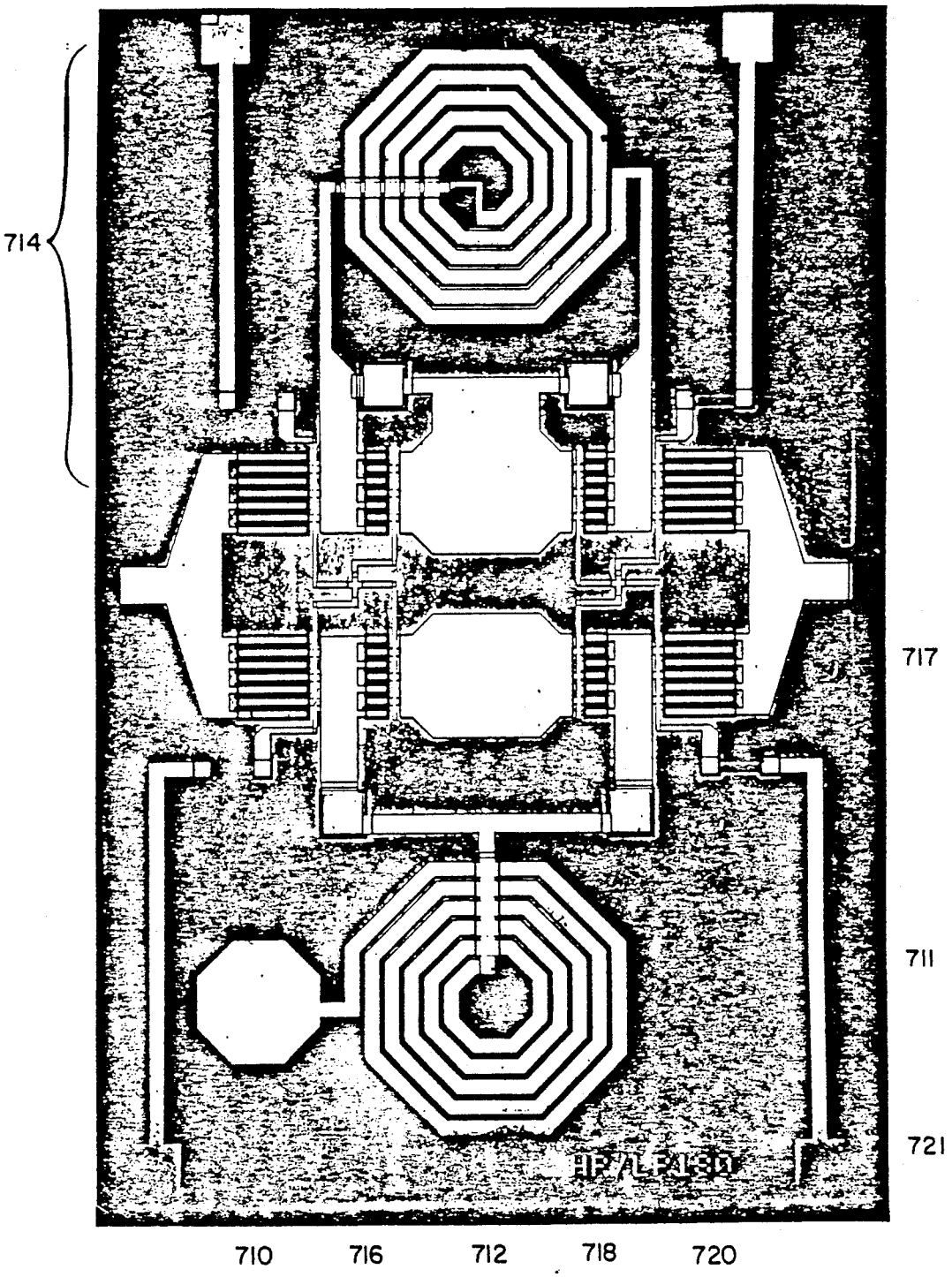
FIG. 7 shows a lumped element integrated circuit embodiment of the FIG. 5 network arranged for 180 degrees of phase shift.
Figure 6:
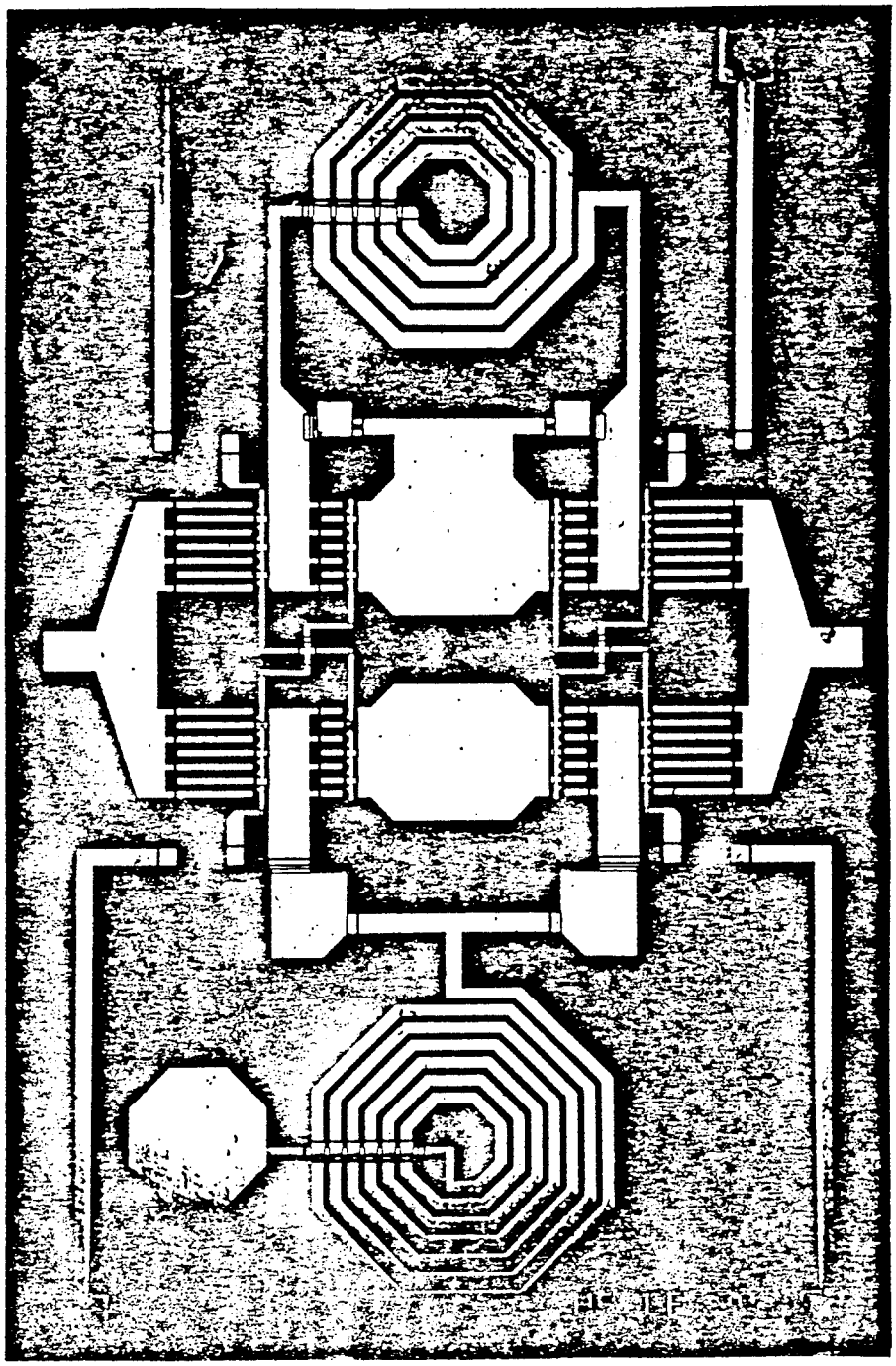
FIG. 6 shows a lumped element integrated circuit embodiment of the FIG. 5 network as arranged for 90 degrees of phase shift.

By way of acknowledgement, in addition to the lumped element concept of the present invention, certain aspects of FIG. 5 as well as FIGS. 6 and 7 also relate to an invention described in application Ser. No. 07/110,015 by Anthony Jacomb-Hood. Additional aspects of the FIGS. 5, 6, and 7 network are also described in the technical article "Affordable MMIC Designs for Phased Arrays" authored by Ronald J. Naster, Anthony Jacomb-Hood, and Mark R. Lang and published in the March 1977 issue of "Microwave Journal", a publication of Horizon House-Microwave, Inc.

FIG. 7 in the drawings shows a microphotograph of an integrated circuit embodiment of the FIG. 5 phase shifting network—an embodiment using the lumped element components of the present invention. With exception of the transposed locations for the inductor at 711, 712 and the grounding pad at 710, 711 in FIG. 7, the presence of the crowbar transistors at 716, 717 and 717, 718 and presence of the uppermost or low-pass portion of the circuit at 714, the components in the FIG. 7 integrated circuit chip are similarly disposed and identified as was discussed in connection with the FIG. 4 chip above.

The FIG. 7 circuit die represents a 180 degree phase shift embodiment of the high-pass/low-pass network arrangement indicated at 720, 721 in FIG. 7. A ninety degree phase shift arrangement of this high-pass/low-pass phase shift bit is also shown in FIG. 6 of the drawings. The FIG. 6 circuit chip is very similar to the FIG. 7 circuit and differs therefrom principally in size and physical arrangement of the inductance at 602, 603 and the capacitors at 604, 605 and 605, 606.

The high-pass/low-pass circuit arrangement of FIG. 7 (i.e., the 180° bit circuit) is found to have significantly lower process sensitivity then is a high-pass/low-pass circuit arrangement in which switch capacitance is integrated into the filter network. These conventional circuits also require less chip area and have slightly higher insertion losses.

Figure 8:
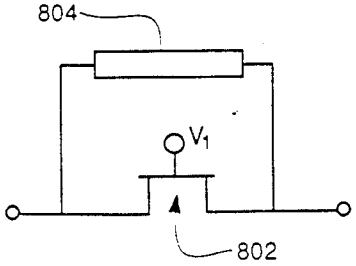
FIG. 8 shows a simplified phase shift bit circuit which is useful at low values of phase shift.

For low values of phase shift, that is, for phase shifts in the order of eleven degrees or less, the single resonated FET bit design shown in FIG. 8 of the drawings may be used. In the FIG. 8 phase shifter, the inherent capacitances of the FET transistor 802 are resonated with the shunting inductance 804 to provide a small value of phase shift. The resonated FET phase shifter of FIG. 8 is found to provide a phase difference that is proportional to frequency, a condition that is acceptable for lower values of phase shift.

Figure 9:
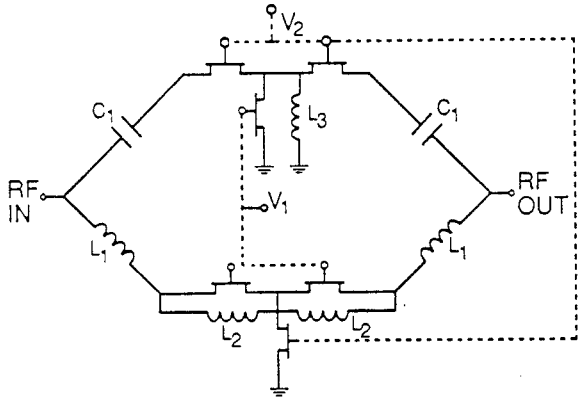
FIG. 9 shows an alternate phase shift network arrangement which may be realized according to the present invention.

FIG. 9 in the drawings shows an other phase shifter bit circuit arrangements which may be used with the present discrete element circuit embodiments and which relate in a plurality of ways to the herebefore described circuit arrangement. In the FIG. 9 drawing is shown an arrangement of the FIG. 5 circuit wherein transistor switches are included in the switched filter sections and in which the off state capacitance of the FET switches is less limiting then in the FIG. 5 circuit 15.

For the ninety degree, forty-five degree, and twenty-two and one-half degree phase shifter bits, the simplified high-pass/low-pass design of FIG. 9 with integrated switches is a desirable circuit approach. This circuit is the least sensitive to process variations and requires the least chip area (except for the twenty-two and one-half degree bit). The twenty-two and one-half degree bit is significantly larger than the series loaded-line design, but its achievable higher processing yield more than outweighs the decrease in unit area yield caused by the larger chip size. The variations in phase angle across the band is also extremely small for these arrangements, as is the difference in insertion loss between states. Furthermore, all the element values required by these circuits are easily realized in monolithic Microwave Integrated Circuit (MMIC) form. For the ninety degree and forty-five degree bits, the conventional high-pass/low-pass approach is slightly more lossy, slightly larger and slightly more process sensitive. The primary eleven and one-quarter degree bit is a simple resonated FET since this circuit has good process variation tolerance and low insertion loss and is small in size. A simplified low-pass/high-pass design is not possible for these bits because of the large inductance values associated with this type of design.

With the lumped element arrangement described herein for the phase shifter bit, significant decreases in physical size, decreases in the range of six to one, can be achieved. In addition to this reduced size and its benefits from the equipment packaging view point the reduced area in such circuits amounts to a significant cost decrease. The reduced area also increases the integrated circuit fabrication yield. These circuits also achieve greater tolerance to process variations and are associated with greater testability and ease of assembly.

While the apparatus and method herein described constitute a preferred embodiment of the invention, it is to be understood that the invention is not limited to this precise form of apparatus or method and that changes may be made therein without departing from the scope of the invention which is defined in the attended claims.

We claim:

1. Integrated circuit digital phase shifter apparatus for use at microwave signal frequencies below ten gigahertz comprising the combination of:

an integrated circuit die member having a semiconductor body portion and an upward facing planar surface;

a plurality of discrete electrical inductance elements disposed in predetermined physical location array across said die member upward facing planar surface; and a plurality of discrete electrical capacitance elements disposed in predetermined physical location array across said upward facing planar surface of said die member in predetermined phase shifting electrical network interconnection with said electrical inductance elements.

2. The phase shifter apparatus of claim 1 wherein said phase shifting electrical network generates one of the phase shift values of eleven and one quarter degrees, twenty-two and one-half degrees, forty-five degrees, ninety degrees, and one hundred eighty degrees at a predetermined frequency below said ten gigahertz frequency.

3. The phase shifter apparatus of claim 1 further including a plurality of phase shifter selecting transistor switch members connected in predetermined electrical circuit with said electrical inductance and electrical capacitance elements.

4. The phase shifter apparatus of claim 3 wherein said transistor switch members comprise field effect transistors.

5. The phase shifter apparatus of claim 3 wherein said transistor switch members comprise electrical shunting means connected across plural elements of said network for altering the network frequency response.

6. The phase shifter apparatus of claim 3 wherein said transistor switch members are connected into a single pole double throw switch configuration.

7. The phase shifter apparatus of claim 1 wherein said electrical inductance elements and electrical capacitance elements comprise one of a tee configured and a pi-configured network.

8. The phase shifter apparatus of claim 1 wherein said electrical inductance elements include concentric circle spiral disposed conductors received on said die surface.

9. The phase shifter apparatus of claim 1 wherein said electrical network comprises both a low-pass and a high-pass frequency selective network.

10. The phase shifter apparatus of claim 1 wherein said phase shifting electrical network comprises a three terminal electrical network.

11. The phase shifter apparatus of claim 1 further including a pi configured electrical network wherein the stem portion of the pi network includes shunt connected inductance and capacitance elements, and the input and output arms of the pi network include series connected inductance and capacitance elements.

12. The phase shifter apparatus of claim 11 wherein said input and output arm inductive elements are shunted by field effect transistors.

13. The phase shifter apparatus of claim 1 further including an input circuit node and an output circuit node and first and second circuit paths connecting said nodes with each of said circuit paths including a combination of electrical reactance elements and field effect transistor elements.

* * * * *